UNITED STATES PATENT OFFICE.

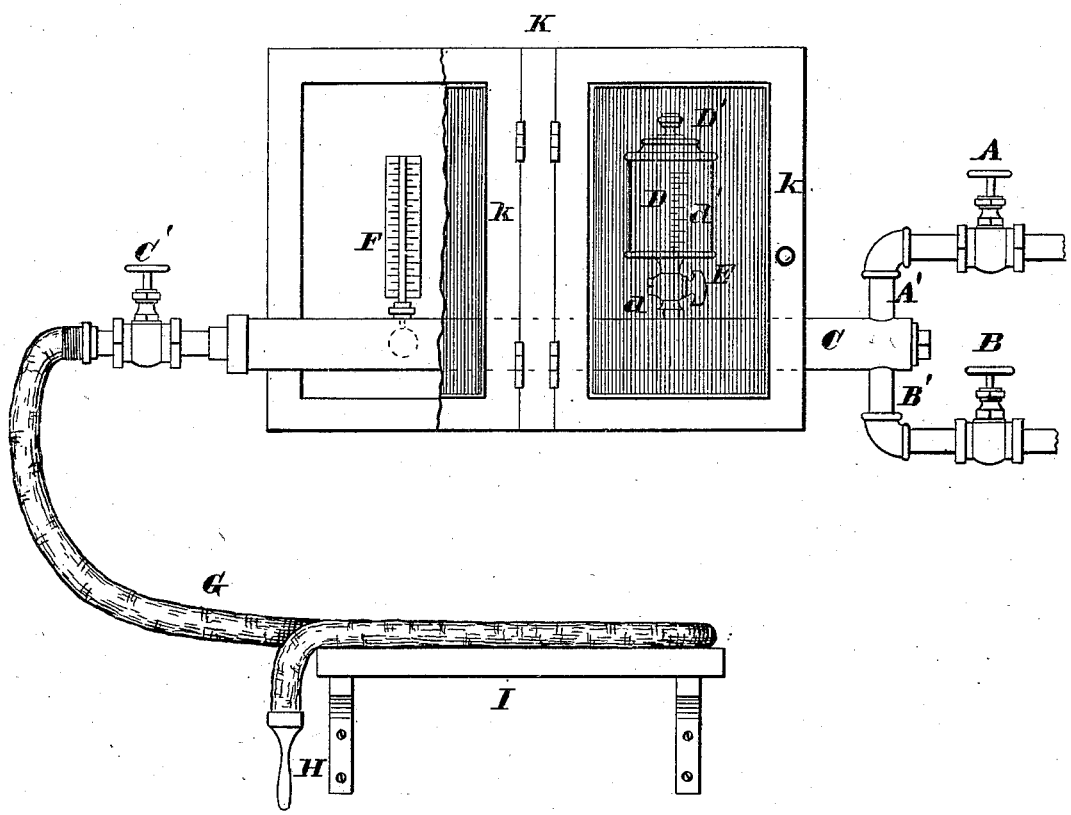

PETER V. SCHENCK, OF ST. LOUIS, MISSOURI, ASSIGNOR TO JAMES W. ALLEN, OF SAME PLACE.

APPARATUS FOR ADMINISTERING INJECTIONS.

SPECIFICATION forming part of Letters Patent No. 256,745, dated April 18, 1882.

Application filed August 26, 1881. (No model.)

*To all whom it may concern:*

Be it known that I, PETER V. SCHENCK, of the city of St. Louis, in the State of Missouri, have invented a certain new and useful Improvement in Apparatus for Administering Injections, Douches, &c., of which the following is a full, clear, and exact description, reference being had to the accompanying drawing, forming part of this specification.

My improvement consists in combining with suitable hot and cold water supply pipes a single pipe provided with a medicament-vessel, and having connected to the said single pipe a hose for distributing the liquid passing therethrough, as hereinafter described.

The drawing is a side elevation of my improvement.

A and B are hot and cold water cocks, both being in connection with a hydrant or some other water-supply under pressure, and the former in connection with any suitable appliance for heating the water. The hot and cold water pipes A' B' connect with a pipe, C, to which is secured a vessel, D, that has a neck, d, connecting the interior of the vessel and the pipe C. The neck has a cock, E, by which it may be closed to close communication between the vessel D and the interior of the pipe C. This vessel may be at any time supplied with ingredients to mingle with the water or other liquid in pipe C, even when there is a pressure of water in said pipe, for the cock E may be closed and the screw lid or cap D' removed and the ingredient put into the vessel. The vessel has glass sides, with a scale, d', to indicate the quantity of medicine or other ingredient placed in the vessel.

I do not confine myself to a single passage d from the vessel to the pipe, for there may be a double communication, giving the water passage directly through the vessel to carry out the ingredients from the vessel.

F is a thermometer whose bulb is immersed in the liquid passing through the pipe C, so as to indicate the temperature of the same.

c' is a cock or valve to close pipe C.

G is a flexible hose connected to the discharge end of pipe C, and having at the end a nozzle, H, which is preferably removable, so that a nozzle of suitable form for any operation may be attached either for an injection, douche, or other purpose.

I is a shelf to receive the hose when not in use.

Though my device is primarily intended as a surgical appliance, and principally for the use of city doctors who have to treat a large number of patients at dispensaries in a short space of time, it being therefore necessary or desirable to have some more rapid mode of treatment, yet it may be used for any other purpose to which it may be adapted. For instance, there may be another hose connected to the discharge end of the pipe C by a T-coupling, to be used for various purposes—as, for example, to fill a bath-tub with water of a desired temperature, the temperature being indicated by the thermometer, and the medicine-vessel being closed by its valve; or carbolic acid may be put into the vessel D and the apparatus be used for cleansing purposes in connection with bath-rooms and water-closets.

K is the inclosing-case, having doors k, one of which is shown partly broken away.

Having thus described my invention, the following is what I claim as new therein and desire to secure by Letters Patent:

In a device for giving injections and like purposes, the combination of the separate hot and cold water pipes with their stop-cocks, the single pipe C, with which they unite, the medical reservoir connected with the single pipe, and a hose and eduction-pipe, all substantially as and for the purposes set forth.

PETER V. SCHENCK.

Witnesses:
ALBERT B. BOWMAN,
GEO. H. KNIGHT.